Figure 7:
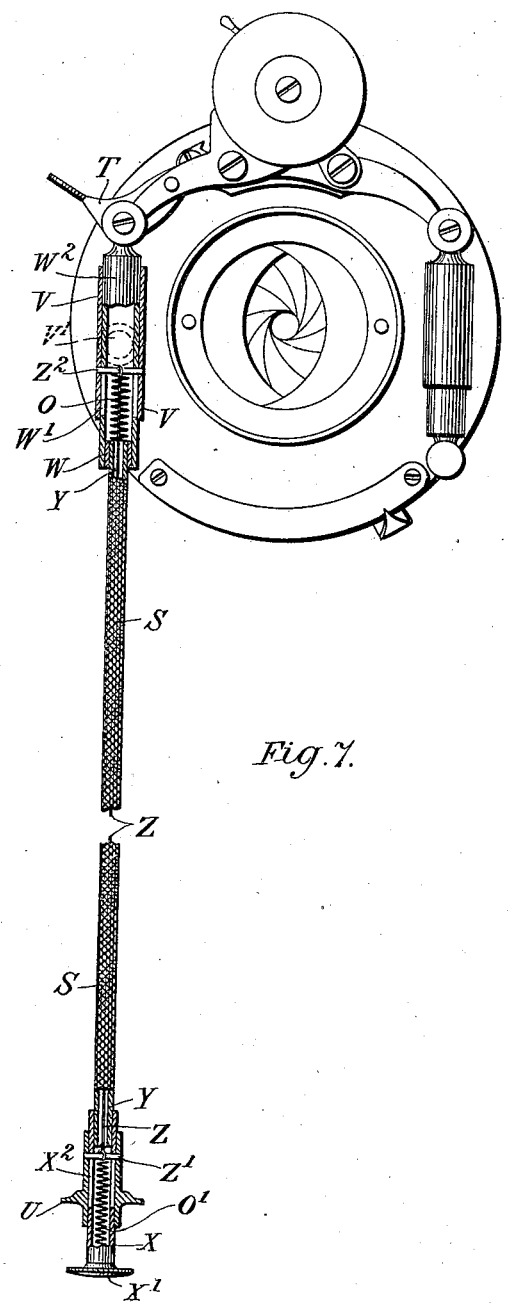

No. 703,904. Patented July 1, 1902.
A. H. EDWARDS.
APPARATUS FOR THE TRANSMISSION OF POWER IN VARYING DIRECTIONS.
(Application filed Jan. 2, 1902.)
(No Model.) 2 Sheets—Sheet 1.
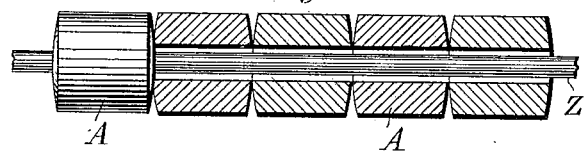
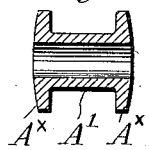
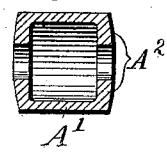
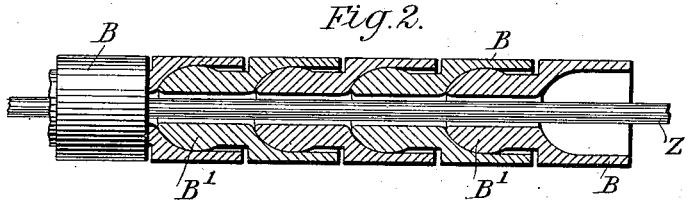
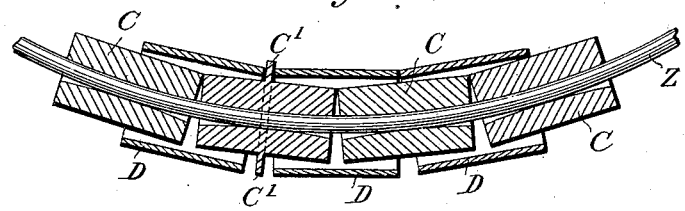
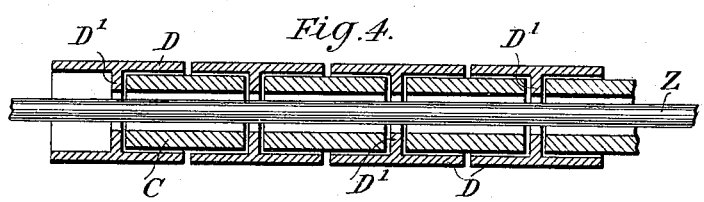
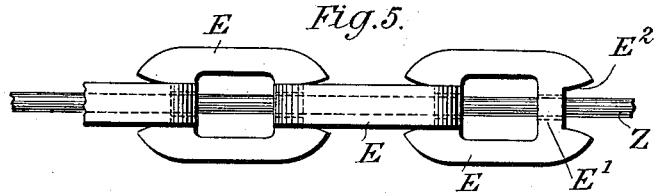
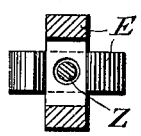
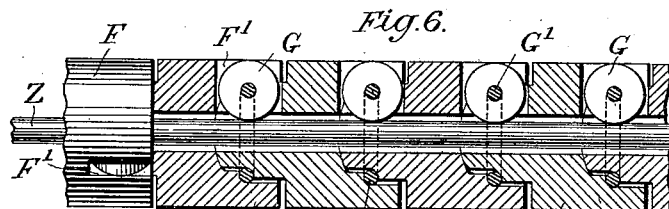
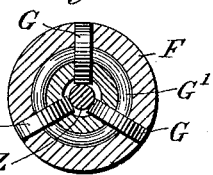
Witnesses: Inventor:
A. H. Edwards
by Wilkinson & Fisher
Attorneys.

No. 703,904.  
Patented July 1, 1902.  
A. H. EDWARDS.  
APPARATUS FOR THE TRANSMISSION OF POWER IN VARYING DIRECTIONS.  
(Application filed Jan. 2, 1902.)  
(No Model.)  
2 Sheets—Sheet 2.

Witnesses:  
Gustave R. Thompson.  
Stephen Giusta.

Inventor:  
A. H. Edwards  
by Wilkinson & John  
Attorneys.

UNITED STATES PATENT OFFICE.

ARTHUR H. EDWARDS, OF LONDON, ENGLAND.

APPARATUS FOR THE TRANSMISSION OF POWER IN VARYING DIRECTIONS.

SPECIFICATION forming part of Letters Patent No. 703,904, dated July 1, 1902.

Application filed January 2, 1902. Serial No. 88,186. (No model.)

*To all whom it may concern:*

Be it known that I, ARTHUR HENRY EDWARDS, engineer, a subject of the King of Great Britain, residing at 96 Lordship road, Stoke Newington, London, England, have invented certain new and useful Improvements in or Relating to Apparatus for the Transmission of Power in Varying Directions, of which the following is a specification.

This invention relates to the transmission of power in the direction of the length of the transmitting mechanism, which latter is flexible, so as to be capable of being curved or coiled in any desired direction, and thereby enables the power to be transmitted in any desired direction—that is, either in a straight line or in any other direction or directions than in a straight line.

According to the present invention I employ any suitable flexible rod, which may either be continuous (as, for instance, a length of flexible wire or wire rope or cord) or a series of links jointed together, or other suitable flexible rod may be employed through which pressure can be exerted, or I may employ any suitable chain—such, for instance, as a closely-linked chain—all of which I will hereinafter refer to as "the inner flexible connection," by means of which latter I may impart either reciprocating motion or transmit power by pressure only or by traction only, as desired. This inner flexible connection I surround or partly surround or incase in an exterior casing or covering, which is non-compressible both in the direction of its length and transversely and is non-extensible transversely, but which nevertheless can be curved or coiled in any desired direction, this exterior casing or covering according to the present invention being formed of a plurality of separate parts—such, for instance, as a series of short rigid tubes, sleeves, or beads—threaded on said inner flexible connection or a series of separate parts linked or hinged or partially connected to one another—such, for instance, as a series of links or frames adapted to butt together or fit into one another either with or without being jointed together; but in all cases these separate parts (sleeves, beads, links, &c.) are of such a form and so arranged as to produce a very flexible outer casing or covering, which, together with the inner flexible connection, can be curved or coiled in any direction and nevertheless when so curved or coiled permit longitudinal movement of the inner flexible connection with respect to said outer casing, or vice versa; and in order that the present invention may be easily understood and readily carried into practice I will proceed to describe same with reference to the drawings hereunto annexed.

Figure 1 is a longitudinal view, partly in section, of one form of construction of the outer casing according to the present invention. Figs. 1ª and 1ᵇ show slightly-modified forms of the short rigid sleeves. Fig. 2 is a similar view to Fig. 1 of a modified construction. Fig. 3 is a longitudinal sectional view of another modification. Fig. 4 is a similar view to Fig. 3, showing a further modification. Fig. 5 is a longitudinal view of the outer casing formed of open links, and Fig. 5ª is an end view thereof. Fig. 6 is a longitudinal view, partly in section, of the outer casing provided with antifriction-rollers; and Fig. 6ª is an end view thereof. Fig. 7 shows the application of this transmitting mechanism to photographic shutters—namely, for the purpose of releasing the well-known form of "diaphragm" photographic shutter.

In Fig. 1 the ends of the short rigid sleeves A (which may advantageously be formed of metal) are rounded at each end where same butt against one another, so as to permit of the curving or coiling of this outer cover, through which the inner flexible connection Z can freely pass, such inner flexible connection Z in this case consisting of stranded wire of a size adapted to pass freely through the opening through said sleeves A. In Fig. 1ª the sleeve is formed with a thinner wall A' and has an outwardly-extending collar A<sup>×</sup> at each end, the ends of this sleeve being rounded, as in the case of Fig. 1. In Fig. 1ᵇ the sleeve A' is formed with an inwardly-extending collar A², the ends being rounded as in Fig. 1. In Fig. 2 the sleeve is formed with an enlarged hollow part B and a rounded extension B' thereon, this latter being of a size and shape adapted to fit inside the rounded hollow portion B of the next adjoining sleeve, and so on, a small amount of play being allowed between said adjoining sleeves, so as thus to impart the desired amount of flexi-